Oct. 14, 1958 — A. L. OTTENAD ET AL — 2,855,668
WEED DIGGERS
Filed Aug. 12, 1954
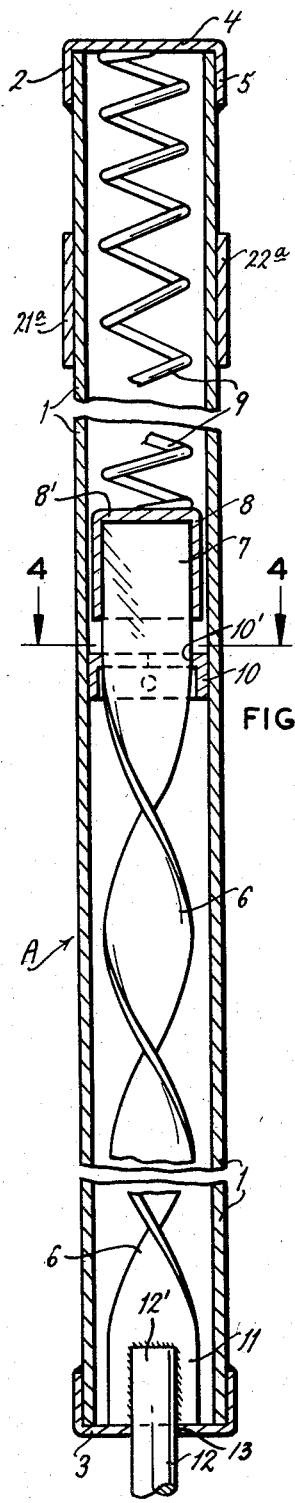
FIG. 3.
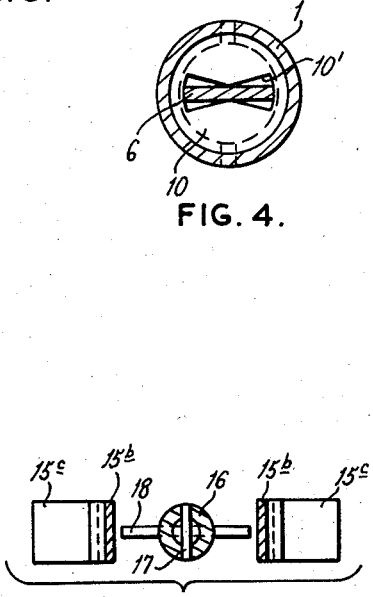
FIG. 5.
FIG. 4.
FIG. 2.
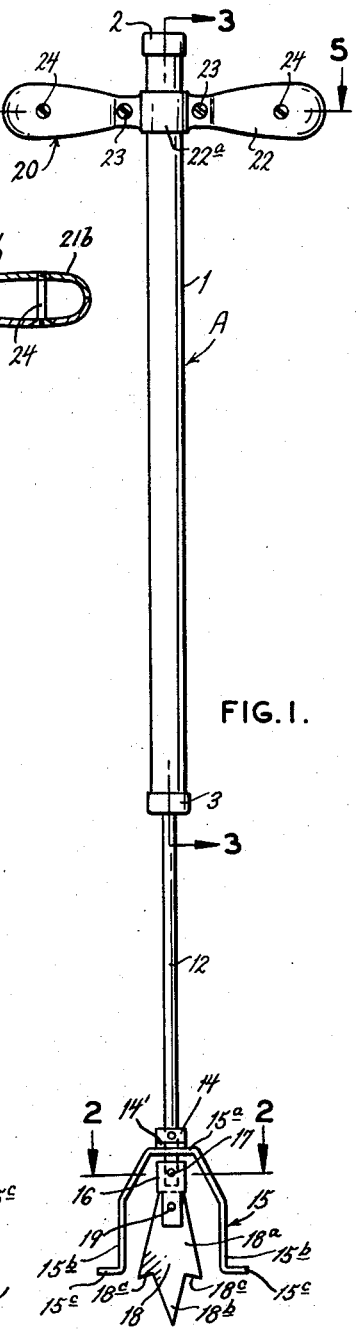
FIG. 1.
INVENTORS
ARTHUR L. OTTENAD
ARTHUR L. OTTENAD, JR.
BY E. M. Harrington,
ATTORNEY

United States Patent Office 2,855,668
Patented Oct. 14, 1958

2,855,668

WEED DIGGERS

Arthur L. Ottenad, Maplewood, and Arthur L. Ottenad, Jr., St. Ann's, Mo.

Application August 12, 1954, Serial No. 449,364

2 Claims. (Cl. 30—276)

This invention relates generally to weed diggers, and more specifically to such a device which includes a rotary cutting blade that cuts into the ground and extracts all or a substantial part of the root of a weed being dug with the aid of the feed digger, the predominant object of the invention being to provide a weed digger of the character referred to above which is of simple construction and is capable of performing its intended function in a highly efficient manner.

Fig. 1 is an elevational view of the improved weed digger of this invention.

Fig. 2 is a horizontal section taken on line 2—2 of Fig. 1.

Fig. 3 is an enlarged, fragmentary, vertical section taken on line 3—3 of Fig. 1.

Fig. 4 is a horizontal section taken on line 4—4 of Fig. 3.

Fig. 5 is a section taken on line 5—5 of Fig. 1.

In the drawing, wherein is shown for purposes of illustration, merely, one embodiment of the invention, A designates in Fig. 1 the improved weed digger generally. The weed digger A comprises an upper tubular casing 1 which is provided at its upper end with a cap 2 and at its lower end with a similar cap 3, each of said caps having a wall 4 from which is extended an annular, marginal flange 5 which embraces a portion of the tubular casing 1. The annular flange 5 of each of the caps 2 and 3 may be secured to the wall of the tubular casing in any suitable manner, as, for example by being welded thereto.

Disposed within the lower portion of the tubular casing is an elongated spiral worm member 6 which is provided with a flat extension 7 at its upper end, said extension being an integral part of said spiral member and being projected into a cap 8. A coil spring 9 is arranged under compression within the upper portion of said tubular casing 1, and said coil spring contacts at its upper end with the inner face of the wall 4 of the cap 2 and at its lower with the top face of the wall 8' of the cap 8. The spiral member 6 projects through an opening 10' formed through a nut 10, said nut being located within the tubular casing 1 and being secured by welding, or otherwise, to said tubular casing at the inner face of the circumferential wall thereof. At its lower end the spiral member 6 is provided with a flat extension 11, similar to the extension 7 at the top of said spiral member and this extension 11 is engaged by the bifurcated, upper end portion 12' of an elongated rod 12, said extension 11 being projected between the spaced portions of said bifurcated portion 12' of the rod 12 and said extension 11 and said rod 12 being secured together by welding, or otherwise. The rod 12 projects through an aperture 13 formed centrally through the wall 4 of the cap 3 and normally extends a considerable distance below the lower end of the tubular casing 1, as shown in Fig. 1.

Adjacent to the lower end of the rod 12 a collar 14 is fixedly mounted on said rod, and the portion of said rod located below said collar extends through an opening formed through a wall 15ª of a foot member 15 and through a washer 14', said foot member including a pair of side portions 15ᵇ which extend downwardly and outwardly from opposite ends of said wall 15ª, with outwardly extended portions 15ᶜ at the lower ends of straight portions of said side portions (Fig. 1). Mounted fixedly on the extreme lower end of the rod 12 is a coupling member 16, said coupling member having an upper portion that is provided with an opening which receives the lower end portion of the rod 12, there being a suitable fastening device 17 for securing said coupling member to said rod. Likewise, the lower portion of the coupling member 16 is bifurcated and the upper portion of a cutting blade 18 is extended between spaced portions of said bifurcated lower portion of said coupling member, a suitable fastening device 19 securing said cutting blade to said coupling member. The cutting blade is preferably shaped as shown in Fig. 1, having a tapered upper portion 18ª and a narrower pointed lower portion or primary point 18ᵇ, said upper portion and lower portion having angular faces or secondary points 18ᶜ where they join one another. The secondary points have lower cutting edges angled downwardly and outwardly adjacent the bottom of the foot. The tubular casing 1 has fixedly mounted thereon at a point adjacent to its top, a handle structure 20 which is employed when the weed digger is being operated.

In the operation of the improved weed digger of this invention, the pointed lower portion 18ᵇ of the cutting blade is inserted in the ground at the base of a weed to be dug until the portions 15ᶜ of the foot member 15 contacts with the surface of the ground. The operator of the weed digger then by pushing downwardly on the handles of the handle structure 20 depresses the tubular casing 1, and the straight-line movement of the nut 10 with the tubular casing 1 subjects the spiral member 6, the rod 12 and cutting blade 18 secured thereto to rotation, and such rotation of the cutting blade 18 in the ground will cut the roots of the weed away so that said cut weed roots are substantially completely removed from from the ground, a tapered hole being left in the ground from which the weed roots have been removed.

The handle structure 20 is made up of a pair of complementary members 21 and 22 which are in the form of sheet metal stampings, said members being of like shape and construction, as shown in Fig. 5. Each member 21 and 22 includes a centrally located, curved portion 21ª or 22ª and extended portions 21ᵇ or 22ᵇ which project in opposite directions from said curved portion. The curved portions 21ª and 22ª produce a circular part of the handle structure which embraces the tubular casing 1 and the extended portions produce the hand grips of the handle structure when said members 21 and 22 are assembled, and in order to cause the curved portions to tightly grip the tubular casing so that the handle structure will be secured in place thereon a pair of bolt and nut assemblies 23 are employed, the shanks of the bolts of which extend through apertures formed through portions of the pair of members 21 and 22 with the nuts applied to said bolt shanks as shown in Fig. 5. Also, to hold the hand grip portions of the handle structure together bolts 24 are employed, said bolts 24 having heads at end thereof, and their shanks being screwthreaded at their opposite ends for screwing into screwthreaded apertures formed in the member 21, the heads of the bolts 24 being countersunk in the apertures which receive them that are formed in the member 22. Obviously the handle structure may be fixedly located at various points on the tubular casing to accommodate operators of different heights.

While we have described this invention as a weed digger it is to be understood that it may be employed with very fine results as a seed planter, the device cutting tapered holes in the ground in which seeds may be dropped and thereafter covered with earth.

We claim:

1. A weed digger comprising a foot member for engaging the ground and projecting upwardly, a bearing member on the upper part of said foot member, a rod journalled in said bearing to extend vertically therefrom, said rod and bearing member having cooperating means for preventing relative axial movement while permitting relative rotary movement, a cutting blade secured to the lower end of said rod below the bearing member and clear of said foot, said cutting blade having a primary point which extends below the foot member and a secondary cutting edge which extends downwardly and outwardly adjacent the bottom of the foot member, and screw means telescoped over the upper portion of said rod for imparting rotary movement to the rod as the screw means is moved axially with respect to the rod.

2. A weed digger comprising a foot member adapted for engaging the ground and projecting upwardly therefrom, a bearing member supported by the foot member in spaced relationship above the bottom thereof, a rod journalled in the bearing member to extend vertically therefrom a substantial distance and also therebelow, a cutting blade secured to the rod beneath said bearing member; said rod, cutting blade and foot member having cooperating means for preventing relative axial movement while permitting relative rotary movement between the foot on one hand and the rod and cutting blade on the other hand, the cutting blade being secured in a position and being formed so as to have a point extending below the bottom of the foot member to penetrate the weed and said blade further having a cutting edge which is at least in part located above said point in the region adjacent the bottom of said foot and disposed outwardly from said point so as to engage the upper portions of the weed, and screw means cooperating with the upper portion of said rod for imparting rotary movement to the rod as the screw means is moved axially with respect to the rod.

References Cited in the file of this patent

UNITED STATES PATENTS

| | | |
|---|---|---|
| 143,084 | Laudermilch | Sept. 23, 1873 |
| 500,538 | Dunlap | June 27, 1893 |
| 533,787 | Carter | Feb. 5, 1895 |
| 542,584 | Carter | July 9, 1895 |
| 843,399 | King | Feb. 5, 1907 |
| 1,251,059 | Larson | Dec. 25, 1917 |
| 1,620,510 | Biese et al. | Mar. 8, 1927 |
| 1,644,426 | Gentsch | Oct. 4, 1927 |
| 2,533,693 | Rose | Dec. 12, 1950 |
| 2,738,580 | Rice | Mar. 20, 1956 |